United States Patent

Viduya et al.

[11] Patent Number: 6,050,147
[45] Date of Patent: Apr. 18, 2000

[54] PRESSURE SENSOR ASSEMBLY

[75] Inventors: Andres Deogracias Viduya, Carmel; Paul Joseph Pitzer, Kokomo, both of Ind.

[73] Assignee: Delco Electronics Corp., Kokomo, Ind.

[21] Appl. No.: 08/986,012

[22] Filed: Dec. 5, 1997

[51] Int. Cl.$^7$ .............................. G01L 7/00; G01L 7/08
[52] U.S. Cl. .............................. 73/756; 73/756; 73/700; 73/715
[58] Field of Search .............................. 73/715, 717, 720, 73/721, 723, 726, 727, 756, 700

[56] References Cited

U.S. PATENT DOCUMENTS

| | | | |
|---|---|---|---|
| 4,129,042 | 12/1978 | Rosvold | 73/727 |
| 4,321,578 | 3/1982 | Nagasu et al. | 338/42 |
| 4,932,266 | 6/1990 | Bauer et al. | 73/727 |
| 5,126,617 | 6/1992 | Lukasiewicz et al. | 310/338 |
| 5,186,055 | 2/1993 | Kovacich et al. | 73/727 |
| 5,212,989 | 5/1993 | Kodama et al. | 73/706 |
| 5,587,601 | 12/1996 | Kurtz | 257/417 |
| 5,706,372 | 1/1998 | Viduya | 385/12 |
| 5,811,684 | 9/1998 | Sokn | 73/706 |
| 5,831,170 | 11/1998 | Sokn | 73/706 |
| 5,874,679 | 2/1999 | Sokn | 73/706 |

FOREIGN PATENT DOCUMENTS 2005295   12/1993   U.S.S.R. .............................. 73/720

*Primary Examiner*—Benjamin R. Fuller
*Assistant Examiner*—Abdullahi Aw-Musse
*Attorney, Agent, or Firm*—Jimmy L. Funke

[57] ABSTRACT

A pressure port for attaching a stainless steel high pressure sensor to an automotive pressure line includes a cold rolled steel ring having a hex-shaped perimeter and a central bore, and a stainless steel stud welded in the ring. A flange of the stud abuts one face of the ring and an interlocking feature between the stud and the ring relieves stress on the weld during installation and removal of the assembly. An end of the stud extends beyond the ring and is threaded for attachment to the housing of a pressure vessel.

4 Claims, 2 Drawing Sheets

PRESSURE SENSOR ASSEMBLY

FIELD OF THE INVENTION

This invention relates to a pressure sensor assembly for an automotive system, and more particularly to an assembly having a low cost two-piece pressure port.

BACKGROUND OF THE INVENTION

It is necessary for automotive controls to obtain a measure of certain pressure parameters such as engine oil pressure, transmission fluid pressure or brake pressure. To this end it is customary to attach pressure sensors to the pressure line of interest. High pressure applications generally utilize a stainless steel diaphragm welded to a pressure port which attaches to the vehicle by a threaded fitting, for example. To permit welding, the pressure port is also comprised of stainless steel material. Such pressure ports are expensive due to the high cost of stainless steel relative to other materials and the difficulty of machining stainless steel.

Any pressure port design must accommodate a hermetic seal for the sensor (and therefore must be weldable to stainless steel) and must withstand the mechanical stresses such as pressure and torque to which the module will be subjected during installation and subsequent use. Proposed alternatives to the one-piece stainless steel pressure port have included multiple piece stainless steel pressure ports. Although this reduces the cost of the pressure port, the cost of the complete sensor is increased due to additional pieces to assemble and the reliability is decreased.

It is desirable, however, to reduce the pressure port cost by reducing the stainless steel content and reducing the overall cost of the pressure sensing module while maintaining high reliability.

SUMMARY OF THE INVENTION

It is therefore an object of the invention to provide an improved pressure sensor assembly with minimal stainless steel usage without reducing its reliability compared to a stainless steel device.

According to the invention, the pressure port comprises an inner stainless steel stud element and a outer cold rolled steel ring element. The stud element is threaded at one end and has a mounting surface for attachment of the pressure sensor at the opposite end. A central axial opening through the stud element couples the pressure sensor to a pressure chamber into which the stud element is threaded. The ring element has a hex-shaped circumference, and is secured to the stud element by welding. A connector assembly covering the sensor element environmentally seals the sensor element and provides access to the electrical pressure signal output of the sensor.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
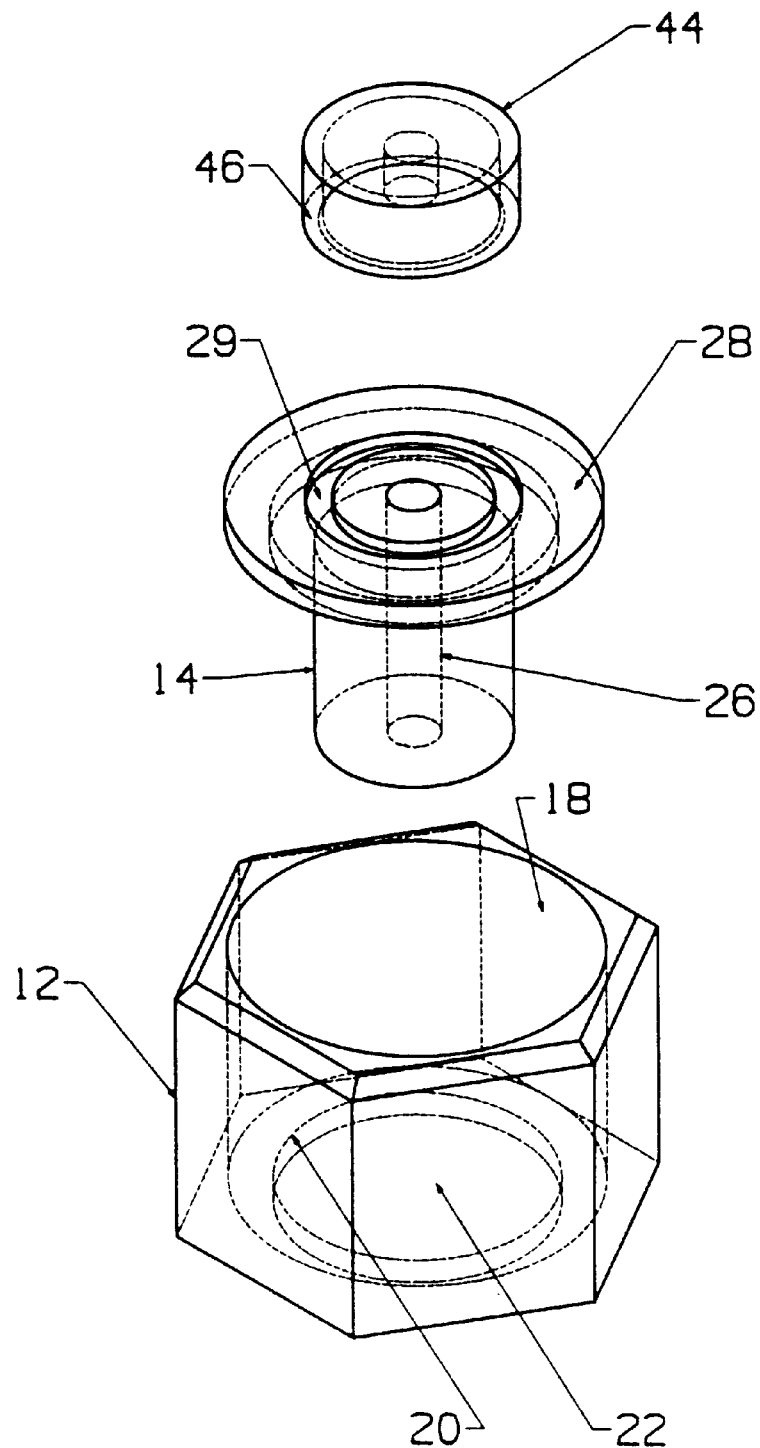
FIG. 1 is an exploded view of a pressure sensor and pressure port according to the invention.
Figure 4:
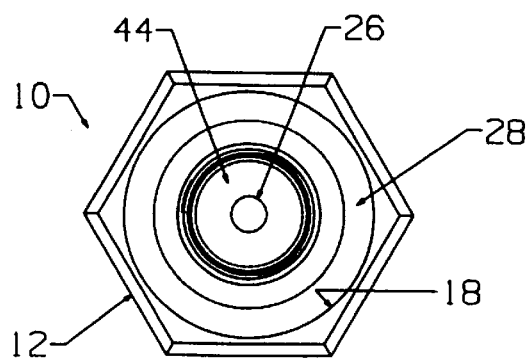
FIG. 4 is a top view of the pressure port.
Figure 2:
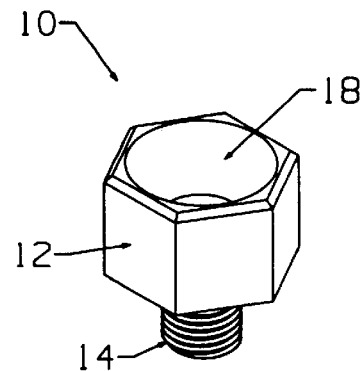
FIG. 2 is an isometric view of the pressure port of FIG. 1.
Figure 3A:
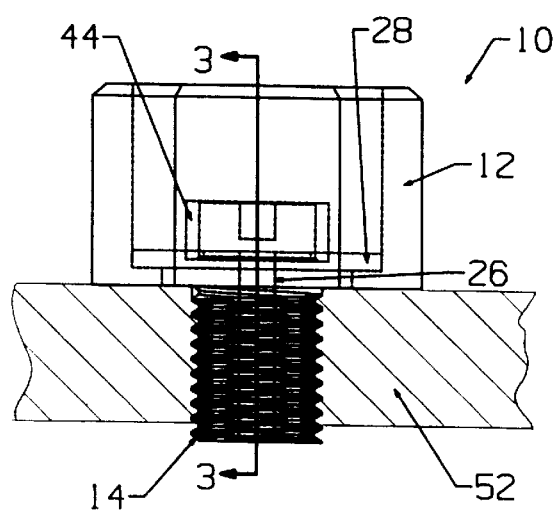
FIG. 3A shown a plan view of the pressure port.
Figure 3B:
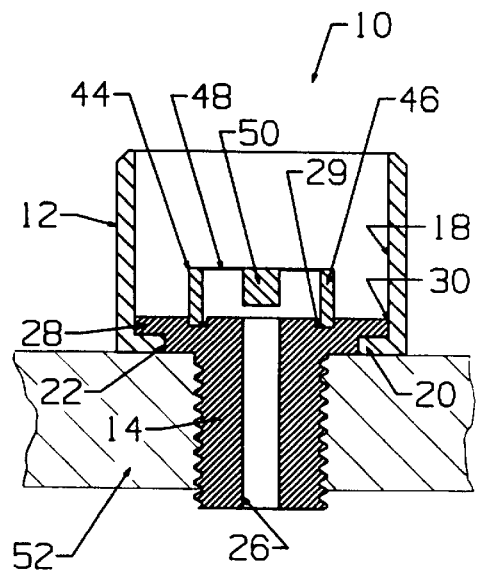
FIG. 3B shows a crossection taken along lines 3—3 in FIG. 3A.

FIGS. 1–4 depict a pressure sensor assembly 10 designed to be threaded into a pressure vessel wall 52, such as the housing of a brake master cylinder, engine crankcase, etc. The assembly 10 comprises a ring 12, a stud 14 and a pressure sensor 44. The ring 12 is formed of inexpensive cold rolled steel, and has a hex-shaped periphery or circumference adapted to be engaged by a tool (not shown) when the assembly 10 is installed in or removed from the pressure vessel housing 52. Ring 12 is formed with a circular central cavity 18 which is fully open on one end and partially closed on the other end by an inwardly extending flange 20, defining a central opening 22. The stud 14 is formed of stainless steel (preferably 304 or 316 stainless steel for weldability), and has a central bore 26 extending through its full length. The stud 14 is threaded on one end for attachment to the pressure vessel housing 52, and at the opposite end, has a stepped flange 28 having a first diameter that matches the diameter of central opening 22 in ring 12 and a second diameter that matches the diameter of cavity 18. Thus, stud 14 is received within the cavity 18 of ring 12, and seats on the flange 20 so that the threaded portion of stud 14 extends through the central opening 22 of ring 12, as best seen in FIGS. 3A–3B. Thus assembled, the stud 14 is welded to the ring 12, as indicated by the reference numeral 30 in FIG. 3B. A key-way or similar mechanical interlocking anti-rotation feature (not shown) between the flanges of stud 14 and ring 12 may be employed to relieve stress on the weld 30 when the sensor assembly 10 is installed or removed.

The pressure sensor element 44, also formed of stainless steel, comprises a cylindrical wall 46 and a thin diaphragm 48 with a central mass 50. The sensor wall 46 is seated in a shallow circular recess 29 formed in flange 28 of stud 14 so that the mass 50 is axially aligned with the central bore 26 of stud 14. The sensor element 44 is welded onto the flange 28 by a laser or electron beam welder, providing a hermetic seal. A good weld is possible due to the stainless steel composition of both stud 14 and sensor 44. Stress sensitive elements formed on the outer surface of diaphragm 48 between the mass 50 and the wall 46, and connected in a bridge arrangement, have a resistance characteristic that changes with the pressure coupled to the inner portion of sensor 44 through the bore 26. These elements are coupled (by wire bonding, for example) to an integrated circuit chip (not shown) which may be mounted on the outer surface of diaphragm 48 opposite mass 50. The integrated circuit detects and amplifies the resistance variations due to the sensed pressure, and provides an electrical signal output indicative of the sensed pressure. A plastic terminal assembly (not shown) with terminal pins coupled to the integrated circuit is inserted into the cavity 18 around sensor element 44 and is secured therein to complete the sensor assembly.

As described above, the assembly of the present invention admits of reduced material and fabrication costs compared to one-piece stainless steel pressure ports and yet maintains high reliability. While the invention has been described in reference to the illustrated embodiment, it will be understood that various modifications will occur to those skilled in the art, and that sensor assemblies incorporating such modifications may fall within the scope of this invention, which is defined by the appended claims.

The embodiments of the invention in which an exclusive property or privilege is claimed are defined as follows:

1. A pressure sensor assembly for a sensor element having a stainless steel body in contact with a pressure to be sensed, the assembly comprising:

a ring member formed of a metal other than stainless steel and having a central cavity and a flat-sided perimeter engageable by a tool during installation and removal of said sensor assembly; and a radially inwardly extending flange partially enclosing said cavity and defining a central opening; and a stud member formed of stainless steel and having a radially outwardly extending flange at one end that received and secured within the central cavity of said ring member and seated on the radially inwardly extending flange of said ring member, and a threaded peripheral surface extending axially out of said ring member through said central opening for attachment of said sensor assembly to a pressure vessel, the radially outwardly extending flange of said stud member is stepped to define a first dimension corresponding to said central opening of said ring member and a second dimension corresponding to said central cavity of said ring member, said stud member having a central axial bore defining a passage coupling first and second axial ends of said stud member;

wherein the stainless steel body of the sensor element is mounted on and welded to the one end of said stainless steel stud member about said central axial bore, enclosing said sensor element within the central cavity of said ring member.

2. The sensor assembly as set forth in claim 1, wherein said ring member is formed of cold rolled steel.

3. The sensor assembly as set forth in claim 1 including a weld securing the stud member to the ring member, and a mechanical interlocking feature between the stud member and the ring member to relieve stress on the weld during installation and removal of the assembly.

4. The sensor assembly as set forth in claim 1, wherein the radially outwardly extending flange of said stud member includes a central recess surrounding said central axial bore, and the body of said sensor element is seated in said recess.

* * * * *